US010794756B2

(12) United States Patent
Mögelin et al.

(10) Patent No.: US 10,794,756 B2
(45) Date of Patent: *Oct. 6, 2020

(54) VIBRATION SENSOR WITH LOW-FREQUENCY ROLL-OFF RESPONSE CURVE

(71) Applicant: Sonion Nederland B.V., Hoofddorp (NL)

(72) Inventors: Raymond Mögelin, Hoofddorp (NL); Peter Christiaan Post, Hoofddorp (NL)

(73) Assignee: Sonion Nederland B.V., Hoofddorp (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/460,391

(22) Filed: Jul. 2, 2019

(65) Prior Publication Data

US 2019/0323881 A1  Oct. 24, 2019

Related U.S. Application Data

(63) Continuation of application No. 15/684,349, filed on Aug. 23, 2017, now Pat. No. 10,386,223.

(30) Foreign Application Priority Data

Aug. 26, 2016 (EP) ..................................... 16186012
Apr. 6, 2017 (EP) ..................................... 17165245

(51) Int. Cl.
*G01H 3/00* (2006.01)
*H04R 1/28* (2006.01)
(Continued)

(52) U.S. Cl.
CPC ................. *G01H 3/06* (2013.01); *G01H 3/00* (2013.01); *H04R 1/2807* (2013.01);
(Continued)

(58) Field of Classification Search
CPC .......... G01H 3/06; G01H 3/00; H04R 1/2807; H04R 1/283; H04R 19/005; H04R 19/001;
(Continued)

(56) References Cited

U.S. PATENT DOCUMENTS 4,607,383 A   8/1986 Ingalls
6,788,796 B1  9/2004 Miles
(Continued)

FOREIGN PATENT DOCUMENTS

CN    2727712 Y    9/2005
EP    1748287 A1   1/2007
(Continued)

OTHER PUBLICATIONS

Extended European Search Report for Application No. 16186012, dated Feb. 23, 2017 (4 pages).
(Continued)

*Primary Examiner* — Suman K Nath
(74) *Attorney, Agent, or Firm* — Nixon Peabody LLP

(57) ABSTRACT

A vibration sensor comprising a pressure detecting arrangement adapted to detect generated pressure variations, and provide an output signal in response to the detected pressure variations, and a pressure generating arrangement adapted to generate pressure variations in response to movements thereof wherein the pressure generating arrangement is secured to an exterior surface portion of the pressure detecting arrangement. In a preferred embodiment the pressure detecting arrangement comprises a stand-alone and self-contained MEMS microphone unit comprising a MEMS microphone cartridge and a signal processing unit.

25 Claims, 11 Drawing Sheets a)

b)

(51) Int. Cl.
   *H04R 19/04* (2006.01)
   *G01H 3/06* (2006.01)
   *H04R 19/00* (2006.01)
   *H04R 17/02* (2006.01)

(52) U.S. Cl.
   CPC ........... *H04R 19/005* (2013.01); *H04R 19/04* (2013.01); *H04R 17/02* (2013.01); *H04R 2201/003* (2013.01)

(58) Field of Classification Search
   CPC ...... H04R 19/016; H04R 19/04; H04R 17/02; H04R 2201/003; G01P 15/00; G01P 15/097; G01P 2015/0882; G01P 5/14
   See application file for complete search history.

(56) References Cited

U.S. PATENT DOCUMENTS

| | | |
|---|---|---|
| 6,831,577 B1 | 12/2004 | Furst |
| 6,853,290 B2 | 2/2005 | Jorgensen |
| 6,859,542 B2 | 2/2005 | Johannsen |
| 6,888,408 B2 | 5/2005 | Furst |
| 6,914,992 B1 | 7/2005 | van Halteren |
| 6,919,519 B2 | 7/2005 | Ravnkilde |
| 6,930,259 B1 | 8/2005 | Jorgensen |
| 6,943,308 B2 | 9/2005 | Ravnkilde |
| 6,974,921 B2 | 12/2005 | Jorgensen |
| 7,008,271 B2 | 3/2006 | Jorgensen |
| 7,012,200 B2 | 3/2006 | Moller |
| 7,062,058 B2 | 6/2006 | Steeman |
| 7,062,063 B2 | 6/2006 | Hansen |
| 7,072,482 B2 | 7/2006 | Van Doorn |
| 7,088,839 B2 | 8/2006 | Geschiere |
| 7,110,560 B2 | 9/2006 | Stenberg |
| 7,136,496 B2 | 11/2006 | van Halteren |
| 7,142,682 B2 | 11/2006 | Mullenborn |
| 7,181,035 B2 | 2/2007 | van Halteren |
| 7,190,803 B2 | 3/2007 | van Halteren |
| 7,206,428 B2 | 4/2007 | Geschiere |
| 7,221,767 B2 | 5/2007 | Mullenborn |
| 7,221,769 B1 | 5/2007 | Jorgensen |
| 7,227,968 B2 | 6/2007 | van Halteren |
| 7,239,714 B2 | 7/2007 | de Blok |
| 7,245,734 B2 | 7/2007 | Niederdraenk |
| 7,254,248 B2 | 8/2007 | Johannsen |
| 7,286,680 B2 | 10/2007 | Steeman |
| 7,292,700 B1 | 11/2007 | Engbert |
| 7,292,876 B2 | 11/2007 | Bosh |
| 7,336,794 B2 | 2/2008 | Furst |
| 7,376,240 B2 | 5/2008 | Hansen |
| 7,403,630 B2 | 7/2008 | Jorgensen |
| 7,415,121 B2 | 8/2008 | Mögelin |
| 7,425,196 B2 | 9/2008 | Jorgensen |
| 7,460,681 B2 | 12/2008 | Geschiere |
| 7,466,835 B2 | 12/2008 | Stenberg |
| 7,492,919 B2 | 2/2009 | Engbert |
| 7,548,626 B2 | 6/2009 | Stenberg |
| 7,657,048 B2 | 2/2010 | van Halteren |
| 7,684,575 B2 | 3/2010 | van Halteren |
| 7,706,561 B2 | 4/2010 | Wilmink |
| 7,715,583 B2 | 5/2010 | Van Halteren |
| 7,728,237 B2 | 6/2010 | Pedersen |
| 7,809,151 B2 | 10/2010 | Van Halteren |
| 7,822,218 B2 | 10/2010 | Van Halteren |
| 7,899,203 B2 | 3/2011 | Van Halteren |
| 7,912,240 B2 | 3/2011 | Madaffari |
| 7,946,890 B1 | 5/2011 | Bondo |
| 7,953,241 B2 | 5/2011 | Jorgensen |
| 7,961,899 B2 | 6/2011 | Van Halteren |
| 7,970,161 B2 | 6/2011 | van Halteren |
| 8,098,854 B2 | 1/2012 | van Halteren |
| 8,101,876 B2 | 1/2012 | Andreasen |
| 8,103,039 B2 | 1/2012 | van Halteren |
| 8,160,290 B2 | 4/2012 | Jorgensen |
| 8,170,249 B2 | 5/2012 | Halteren |
| 8,189,804 B2 | 5/2012 | Hruza |
| 8,189,820 B2 | 5/2012 | Wang |
| 8,223,996 B2 | 7/2012 | Beekman |
| 8,233,652 B2 | 7/2012 | Jorgensen |
| 8,259,963 B2 | 9/2012 | Stenberg |
| 8,259,976 B2 | 9/2012 | van Halteren |
| 8,259,977 B2 | 9/2012 | Jorgensen |
| 8,280,082 B2 | 10/2012 | van Halteren |
| 8,284,966 B2 | 10/2012 | Wilk |
| 8,313,336 B2 | 11/2012 | Bondo |
| 8,315,422 B2 | 11/2012 | van Halteren |
| 8,331,595 B2 | 12/2012 | van Halteren |
| 8,369,552 B2 | 2/2013 | Engbert |
| 8,379,899 B2 | 2/2013 | van Halteren |
| 8,509,468 B2 | 8/2013 | van Halteren |
| 8,526,651 B2 | 9/2013 | Lafort |
| 8,526,652 B2 | 9/2013 | Ambrose |
| 2003/0076970 A1 | 4/2003 | van Halteren |
| 2004/0249633 A1 | 12/2004 | Asseily |
| 2006/0227984 A1 | 10/2006 | Sinclair |
| 2010/0077863 A1 | 4/2010 | Miyoshi |
| 2010/0275675 A1 | 11/2010 | Seppa |
| 2011/0179876 A1 | 7/2011 | Kasai |
| 2011/0182453 A1 | 7/2011 | van Hal |
| 2011/0189880 A1 | 8/2011 | Bondo |
| 2011/0299708 A1 | 12/2011 | Bondo |
| 2011/0299712 A1 | 12/2011 | Bondo |
| 2011/0311069 A1 | 12/2011 | Ambrose |
| 2012/0014548 A1 | 1/2012 | van Halteren |
| 2012/0027245 A1 | 2/2012 | van Halteren |
| 2012/0140966 A1 | 6/2012 | Mocking |
| 2012/0155683 A1 | 6/2012 | van Halteren |
| 2012/0155694 A1 | 6/2012 | Reeuwijk |
| 2012/0255805 A1 | 10/2012 | van Halteren |
| 2013/0028451 A1 | 1/2013 | de Roo |
| 2013/0136284 A1 | 5/2013 | van Hal |
| 2013/0142370 A1 | 6/2013 | Engbert |
| 2013/0163799 A1 | 6/2013 | van Halteren |
| 2013/0195295 A1 | 8/2013 | van Halteren |
| 2015/0251898 A1 | 9/2015 | Vos |
| 2016/0003698 A1 | 1/2016 | Wiesbauer |
| 2016/0112808 A1 | 4/2016 | Geiger |
| 2017/0289703 A1 | 10/2017 | Bartl |
| 2018/0139543 A1 | 5/2018 | Clerici |

FOREIGN PATENT DOCUMENTS

| | | |
|---|---|---|
| EP | 2320678 A1 | 5/2011 |
| EP | 2536169 A1 | 12/2012 |
| GB | 2451909 A | 2/2009 |
| JP | 2013-175847 A | 9/2013 |

OTHER PUBLICATIONS

Extended European Search Report for Application No. 17165245, dated Dec. 15, 2017 (3 pages).

a)

b)

c)

d)

a)

b)

VIBRATION SENSOR WITH LOW-FREQUENCY ROLL-OFF RESPONSE CURVE

CROSS-REFERENCE TO RELATED APPLICATIONS

This application is a continuation of U.S. patent application Ser. No. 15/684,349, filed Aug. 23, 2017, now allowed, which claims the benefit of and priority to European Patent Application Serial No. 16186012.7 filed Aug. 26, 2016 and European Patent Application Serial No. 17165245.6, filed Apr. 6, 2017, all of which are incorporated herein by reference in their entireties.

FIELD OF THE INVENTION

The present invention relates to a vibration sensor having a predetermined low-frequency roll-off response curve and optionally a predetermined damping of a mechanical resonance frequency.

BACKGROUND OF THE INVENTION

Most vibration sensors of today have a flat low-frequency response curve, i.e. the frequencies below the mechanical resonance frequency of typical vibrations sensors are not damped, acoustically or any other way. For various reasons, such as for example noise or overload reasons, it is advantageous to remove, or at least damp, the low frequencies. One often used approach is to remove or damp the low frequencies electronically using an electronic filter in for example the signal processing device. However, this approach is disadvantageous in that the mechanical system of the sensor or the input stage of the signal processing device might still be overloaded by precisely the low frequency signals that the electronic filter is intended to remove. Also, electronic filters take up valuable space on the ASIC, could cause distortion of the signal and cause thermal noise which may degrade the signal-to-noise ratio. Typical prior art solutions are discussed in CN 2727712 Y and US 2011/0179876 A1.

It may be seen as an object of embodiments of the present invention to provide a vibration sensor having a predetermined low-frequency response curve.

It may be seen as a further object of embodiments of the present invention to provide an arrangement where the predetermined low-frequency response curve of the vibration sensor is not provided by electronic means.

It may be seen as an even further object of embodiments of the present invention to provide a vibration sensor having a predetermined damping of a mechanical resonance frequency.

SUMMARY OF INVENTION

The above-mentioned objects are complied with by providing, in a first aspect, a vibration sensor comprising 1) a moveable mass being adapted to generate pressure variations in response to movements thereof,
2) a pressure transmitting arrangement for transmitting the generated pressure variations,
3) a pressure detection arrangement being adapted to detect the transmitted pressure variations, and provide an output signal in response to the detected transmitted pressure variations, and
4) a first acoustical opening defining a first acoustical impedance being acoustically connected to the pressure transmitting arrangement, the first acoustical impedance setting a predetermined low-frequency roll-off response of the vibration sensor.

Thus, according to the first aspect the present invention relates to a vibration sensor where pressure variations generated by movements of a moveable mass are detected by an appropriate pressure detection arrangement. The generated pressure variations may propagate across a pressure transmitting arrangement, which may be in the form of a pressure transmitting volume, before reaching the appropriate pressure detection arrangement. As explained later the vibration sensor may comprise a plurality of moveable masses, a plurality of pressure transmitting arrangements as well as a plurality of pressure detection arrangements.

In the present disclosure a predetermined low-frequency roll-off response should be taken to mean that the vibration sensor response below a predefined frequency may be damped in a predetermined manner. In case the input signal contains high level unwanted (noise) signals below the predefined frequency this sort of damping is advantageous in that traditional overload of the processing electronics, such as ASICs, may then be completely avoided. Alternatively, the predetermined low-frequency roll-off response may be provided by the first acoustical impedance and the processing electronics in combination.

It is advantageous that the predetermined low-frequency roll-off response may open up the possibility to increase the amplification of signals with a frequency above the predefined frequency, without possible overload of the processing electronics by noise signals.

The first acoustical impedance may set a predefined damping at selected frequencies by providing a low-frequency roll-off of the response curve. The frequency below which the response may start to roll off, the so-called −3 dB point, may be varied by varying the value of the first acoustical impedance, and may in principle be chosen arbitrary.

However, the −3 dB point may be in the frequency range of 50-2000 Hz, such as around 100 Hz, 200 Hz, 500 Hz or 1000 Hz.

The first acoustical impedance results in a rate at which the response curve rolls off of −6 dB/octave. Higher roll-off rates can be obtained by combining the acoustic roll-off of with other known filter/damping means, electronically, acoustically or in any other way, resulting in higher order filtering/damping.

The movable mass may be implemented in various ways, such as a solid structure. In order to be able to move in responds to vibrations the moveable mass may be suspended in a resilient suspension member. The following disclosure will reveal that the resilient suspension member may be implemented in various ways.

As indicated above the pressure transmitting arrangement may involve a pressure transmitting volume where pressure variations generated by the moveable mass is allowed to propagate in order to reach an appropriate pressure detection arrangement.

The first acoustical opening defining the first acoustical impedance may comprise a through-going opening having predetermined dimensions, said predetermined dimensions setting the first acoustical impedance. Generally, the larger the dimensions of the through-going opening the smaller the acoustical impedance.

The first acoustical impedance may be provided between the pressure transmitting arrangement and the exterior of the vibration sensor, i.e. an open and infinite volume. Alternatively or in combination therewith the first acoustical impedance may be provided across the pressure detection arrangement, such as between the pressure transmitting arrangement and a substantially closed volume. In this configuration the pressure transmitting arrangement may act as an acoustical front volume, whereas the substantially closed volume may act as an acoustical rear volume.

The vibration sensor of the present invention may further comprise a second acoustical opening defining a second acoustical impedance between the pressure transmitting arrangement and a substantially closed damping volume. The second acoustical impedance may, in combination with the moveable mass and substantially closed damping volume, set a predetermined damping of a mechanical resonance frequency of the vibration sensor.

Typically, the mechanical resonance frequency of the vibration sensor is a few kHz, such as between 1 kHz and 10 kHz, with peak levels up to several 10's of dB's, such as between 5 dB and 45 dB. The level of damping of the mechanical resonance frequency may range from a small damping up to complete damping of the peak, i.e. between 5 and 45 dB. The pressure transmitting arrangement and the substantially closed damping volume may be essentially oppositely arranged relative to the moveable mass, i.e. the moveable mass may, optionally in combination with a suspension member, separate the pressure transmitting arrangement and the damping volume. Thus, the suspension member and/or the moveable mass may define at least part of a boundary of the substantially closed damping volume.

The second acoustical impedance between the pressure transmitting arrangement and the damping volume may comprise a through-going opening in the moveable mass and/or in a suspension member suspending the moveable mass. The predetermined dimensions of said through-going opening may determine the second acoustical impedance. Again, the larger the dimensions of the through-going opening the smaller the acoustical impedance.

The pressure detection arrangement may comprise a pressure sensitive device adapted to detect the transmitted pressure variations. As stated previously the pressure sensitive device may form part of a microphone, such as an electret microphone or a MEMS microphone.

The suspension member and/or the moveable mass may, in combination with the pressure sensitive device, define at least part of a boundary of the pressure transmitting arrangement. Moreover, a primary direction of movement of the moveable mass and a direction of movement of at least part of the pressure sensitive device, such as a detecting membrane, may be substantially parallel to each other. Alternatively, a primary direction of movement of the moveable mass and a direction of movement of at least part of the pressure sensitive device, such as a detecting membrane, may be angled relative to each other.

The vibration sensor may further comprise one or more additional moveable masses being adapted to generate pressure variations in response to respective movements thereof, wherein the one or more additional moveable masses may be adapted to move in either different directions or in essentially the same direction. Thus, the vibration sensor may for example comprise three moveable masses having the primary directions of movement in either the same direction or in directions being angled relative to each other, such as in three directions being angled essentially 90 degrees relative to each other in order to be sensitive to 3D vibrations.

The moveable masses may be arranged such that they generate a combined pressure difference in one pressure transmitting arrangement, said pressure difference being detected by one pressure detecting arrangement. Alternatively, the moveable masses may generate pressure differences in a plurality of pressure transmitting arrangements being detected by a plurality of pressure detecting arrangements In addition the moveable masses may be arranged, via their respective suspension arrangements, to provide linear and/or rotational movements in response to incoming vibrations.

The vibration sensor of the present invention may further comprise signal processing means, such as one or more ASICs, for processing the output signal from the pressure detection arrangement.

In a second aspect the present invention relates to a vibration sensor comprising 1) a pressure detecting arrangement adapted to detect generated pressure variations, and provide an output signal in response to the detected pressure variations, and 2) a pressure generating arrangement adapted to generate pressure variations in response to movements thereof wherein the pressure generating arrangement is secured to an exterior surface portion of the pressure detecting arrangement.

Thus, according to the second aspect the present invention relates to a pressure generating arrangement that may be secured to an exterior surface portion of a pressure detecting arrangement. This exterior surface portion of the pressure detecting arrangement may preferably be the largest exterior surface of the pressure detecting arrangement. The reason for this being that the area of the active components of the pressure generating arrangement, such as a suspension member and a moveable mass, may then be maximized.

The pressure generating arrangement may comprise a suspension member and moveable mass secured thereto. The suspended moveable mass may generate pressure variations in response to movements of the vibration sensor. The pressure detecting arrangement may comprise a microphone unit comprising a microphone cartridge and a signal processing unit.

Thus, according to the second aspect the present invention relates to a vibration sensor where pressure variations generated by movements of a moveable mass are detected by an appropriate pressure detection arrangement, such as a microphone unit comprising a microphone cartridge and a signal processing unit. The generated pressure variations may propagate across a pressure transmitting arrangement, which may be in the form of a pressure transmitting volume or intermediate volume, before reaching the appropriate pressure detection arrangement.

In a preferred embodiment the microphone unit may comprise a stand-alone and self-contained MEMS microphone unit comprising a MEMS microphone cartridge and the signal processing unit. In the present context a stand-alone and self-contained MEMS microphone unit should be understood as a fully functional microphone unit. The MEMS cartridge of the microphone unit may comprise a read-out arrangement comprising a piezo, a biased plate capacitor or an electret plate capacitor.

Is it advantageous to use a stand-alone and self-contained MEMS microphone in that at least the following advantages are associated therewith: low development costs, low price of the MEMS microphone unit itself, easy to brand, reflowable, digital as well as analog variants, various sizes available (trade off with performance (sensitivity/noise) etc.

The stand-alone and self-contained MEMS microphone unit may comprise a first PCB to which first PCB the MEMS microphone cartridge and the signal processing unit are electrically connected. Moreover, the stand-alone and self-contained MEMS microphone unit may comprise a second PCB comprising a plurality of contact zones arranged thereon, said second PCB being oppositely arranged relative to the first PCB. Thus, the stand-alone and self-contained MEMS microphone unit may form a sandwich construction where the first and second PCBs may be the upper and lower surface, respectively.

An intermediate volume may exist between an outer surface of the first PCB of the MEMS microphone unit and a surface of the suspension member. This intermediate volume may be considered a pressure transmitting volume through which volume the generated pressure variations propagates the MEMS microphone unit. In order to allow generated pressure variations to enter the MEMS microphone unit and thereby reach the MEMS cartridge the first PCB may comprise a through-going opening being acoustically connected to the intermediate volume. The intermediate volume may be smaller than 5 mm$^3$, such as smaller than 2 mm$^3$, such as smaller than 1 mm$^3$, such as smaller than 0.75 mm$^3$, such as smaller than 0.5 mm$^3$, such as smaller than 0.25 mm$^3$, such as smaller than 0.1 mm$^3$.

In order to provide sufficient pressure variations the area of the suspension member may be larger than 0.5 mm$^2$, such as larger than 1 mm$^2$, such as larger than 2 mm$^2$, such as larger than 4 mm$^2$, such as larger than 6 mm$^2$, such as larger than 8 mm$^2$, such as larger than 10 mm$^2$. The mass of the moveable mass is larger than 0.004 mg, such as larger than 0.04 mg, such as larger than 0.4 mg, such as larger than 1 mg, such as larger than 2 mg, such as around 4 mg.

BRIEF DESCRIPTION OF THE DRAWINGS

The present invention will now be described in further details with reference to the accompanying figures, wherein.

Figure 1:
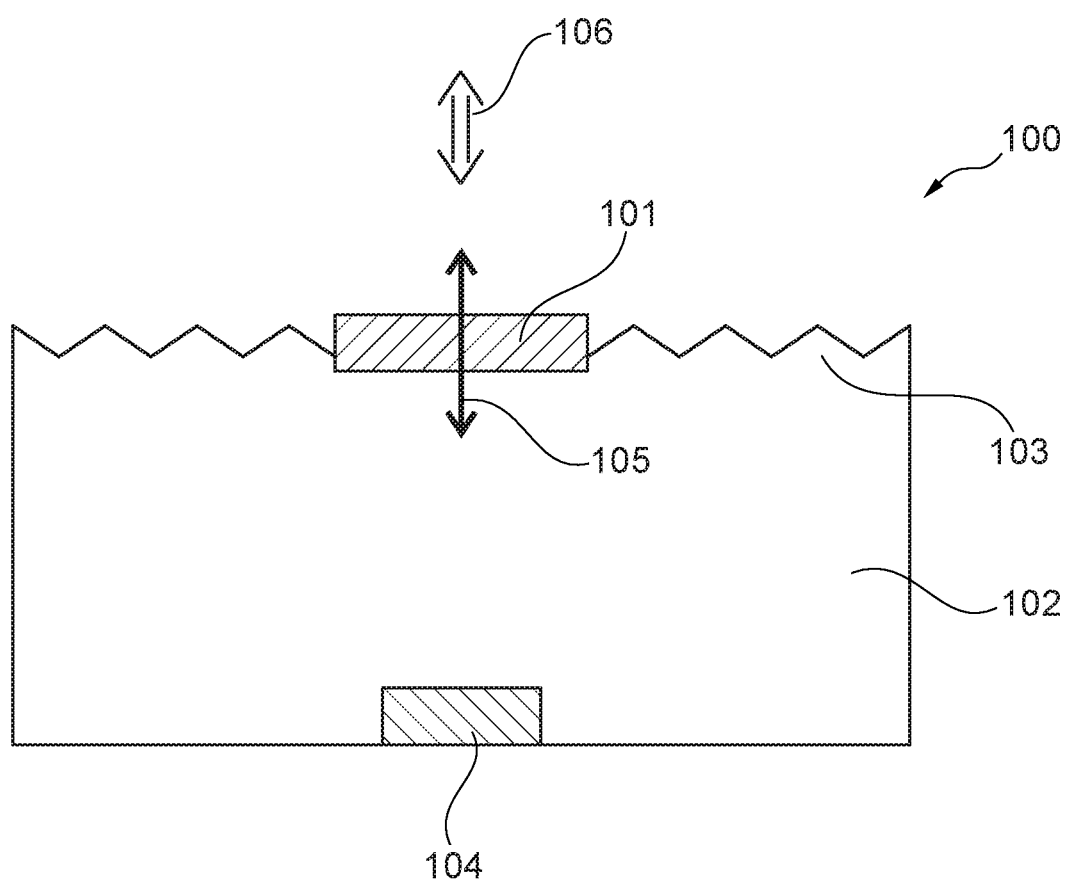
FIG. 1 shows a cross-sectional view of the general principle underlying the present invention.

While the invention is susceptible to various modifications and alternative forms specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In its broadest aspect the present invention relates to a vibration sensor where pressure variations generated by one or more moveable masses are detected using appropriate detection means, such as one or more microphones. The microphones may in principle be of any suitable type, including electret or MEMS microphones.

Figure 2:
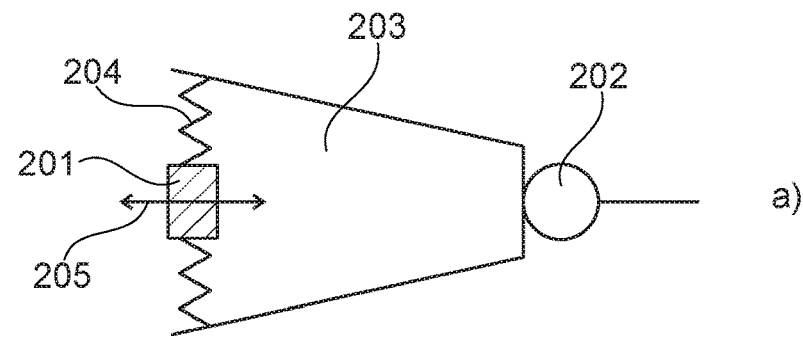
FIG. 2 shows cross-sectional views of various suspension members of the moveable mass.
Figure 2:
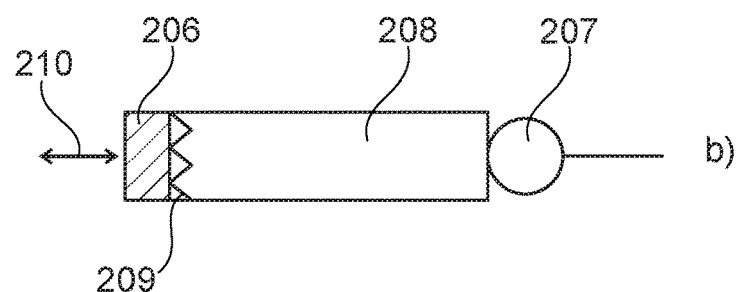
Figure 2:
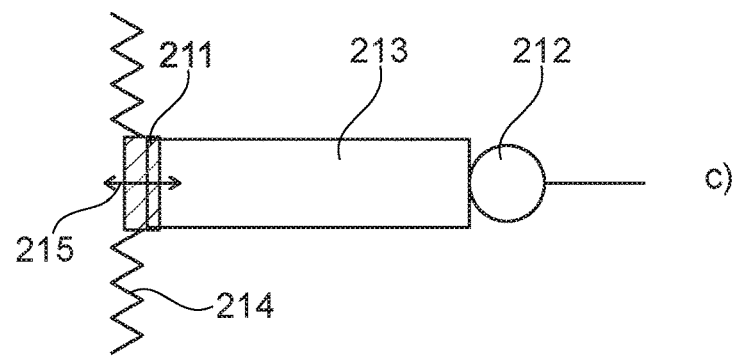
Figure 2:
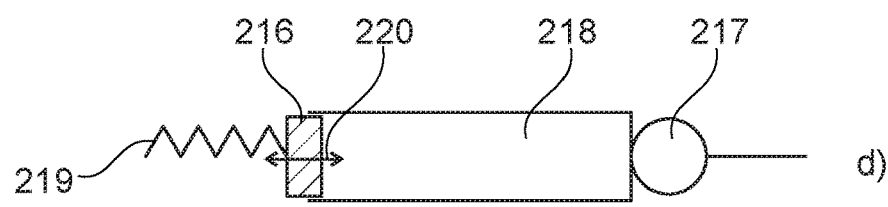

Referring now to FIG. 1 the principle underlying the present invention is depicted. Generally, the vibration sensor 100 of the present invention comprises a moveable mass 101 which is adapted to move as indicated by the arrow 105 in response to vibrations as indicated by arrow 106. The moveable mass 101 is suspended is some sort of resilient suspension member 103 whereby the moveable mass 101 is allowed to move as indicated by the arrow 105. The suspension member 103 may be implemented in various ways as depicted in FIG. 2. Returning now to FIG. 1 a microphone 104 is provided in order to detect the pressure variations being transmitted through the pressure transmitting volume 102 in response to the vibration induced movements of the moveable mass 101. A vibration sensor of the type depicted in FIG. 1 typically has a mechanical vibration frequency around a few kHz, such as between 1 kHz and 10 kHz.

Referring now to FIG. 2 various implementations of the resilient suspension member for suspending the moveable mass are depicted.

In FIG. 2a the moveable mass 201 is suspended to the sides via the suspension member 204. The moveable mass 201 is adapted to respond to vibrations as indicated by the arrow 205, i.e. in a direction being essentially perpendicular to the main direction of extension of the suspension member 204. Pressure variations generated by movements of the moveable mass 201 is transmitted via the pressure transmitting volume 203 and detected using the microphone 202.

In FIG. 2b the moveable mass 206 is positioned on top of the suspension member 209. The moveable mass is 206 adapted to respond to vibrations as indicated by the arrow 210. Associated pressure variations generated in the pressure transmitting volume 208 are detected using the microphone 207.

In FIG. 2c the moveable mass 211 is suspended to the sides via the external suspension member 214. The moveable mass 211 is adapted to respond to vibrations as indicated by the arrow 215. Associated pressure variations generated in the pressure transmitting volume 213 are detected using the microphone 212.

Finally, in FIG. 2d the moveable mass 216 is suspended in the external suspension member 219. The moveable mass 216 is adapted to respond to vibrations as indicated by the arrow 220, i.e. in the longitudinal direction of the suspension member 219. Associated pressure variations generated in the pressure transmitting volume 218 are detected using the microphone 217.

In the various implementations depicted in FIG. 2 the suspension member 204, 209, 214, 219 may be in the form of a spring, such as a helical spring, a leaf spring, tensionless membrane or any other resilient material. As already addressed the microphones 202, 207, 212, 217 may in principle be of any type, including electret or MEMS microphones.

Figure 3:
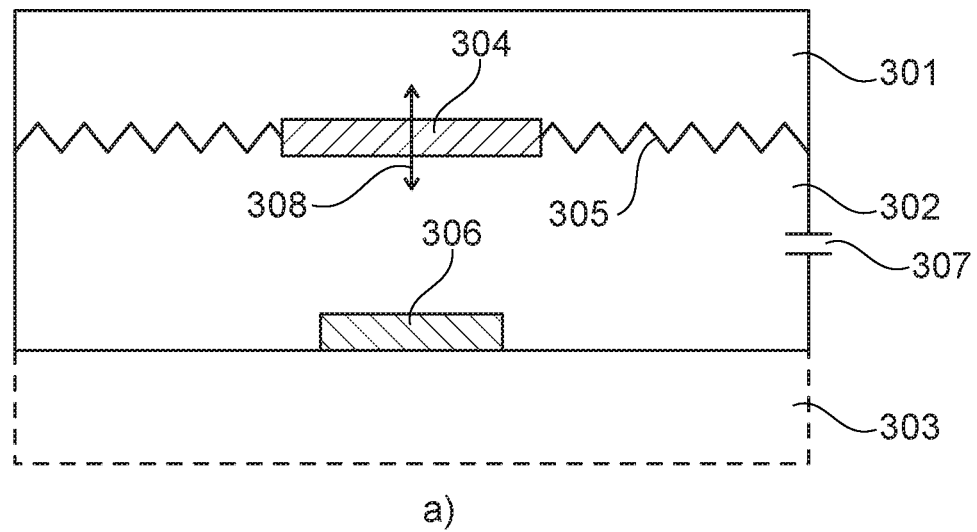
FIG. 3 shows a cross-sectional view of a vibration sensor having a low-frequency roll-off response.
Figure 3:
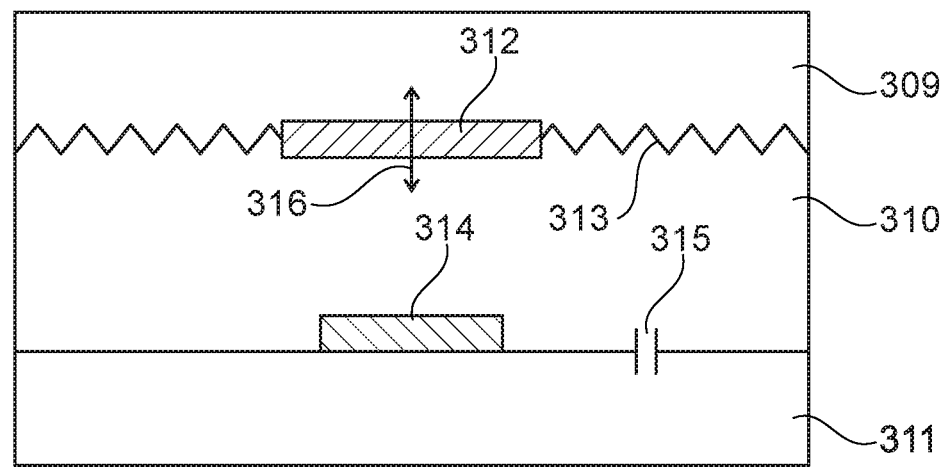

Turning now to FIG. 3, both FIGS. 3a and 3b show embodiments where acoustical impedances in the form of acoustical openings 307, 315 are provided. The acoustical impedances ensure that the vibration sensor has a predetermined low-frequency roll-off response curve, i.e. a predetermined damping of the response curve below a predetermined frequency.

FIG. 3a shows an embodiment of the vibration sensor where an acoustical opening 307 is provided between the pressure transmitting volume 302 and the exterior of the vibration sensor. The acoustical impedance of the acoustical opening 307 determines, together with the other mechanical/acoustical properties of the system, the behaviour of the low-frequency roll-off response curve of the vibration sensor, cf. FIGS. 5 and 6. In addition to the acoustical opening 307 the embodiment shown in FIG. 3a comprises a moveable mass 304 being suspended in a resilient suspension member 305. The moveable mass 304 is adapted to move in the direction of the arrow 308. The moveable mass 304 in combination with the resilient suspension member 305 separates the two volumes 301 and 302—the latter being the pressure transmitting volume 302. The third and optional volume 303 may be provided as well. The pressure variations induced by the moveable mass 304 is detected by the microphone 306.

FIG. 3b shows an embodiment of the vibration sensor where an acoustical opening 315 is provided between the pressure transmitting volume 310 and a substantially closed volume 311. The pressure transmitting volume 310 and the substantially closed volume 311 act as respective front and rear volumes relative to the microphone 314. Similar to the embodiment of FIG. 3a the acoustical impedance of the acoustical opening 315 determines the behaviour of the low-frequency roll-off response curve of the vibration sensor, cf. FIGS. 5 and 6. In addition to the acoustical opening 315 the embodiment shown in FIG. 3b comprises a moveable mass 312 being suspended in a resilient suspension member 313. The moveable mass 312 is adapted to move in the direction of the arrow 316. The moveable mass 312 in combination with the resilient suspension member 313 separates volume 309 from the pressure transmitting volume 310. The pressure variations induced by the moveable mass 312 is detected by the microphone 314.

Figure 4:
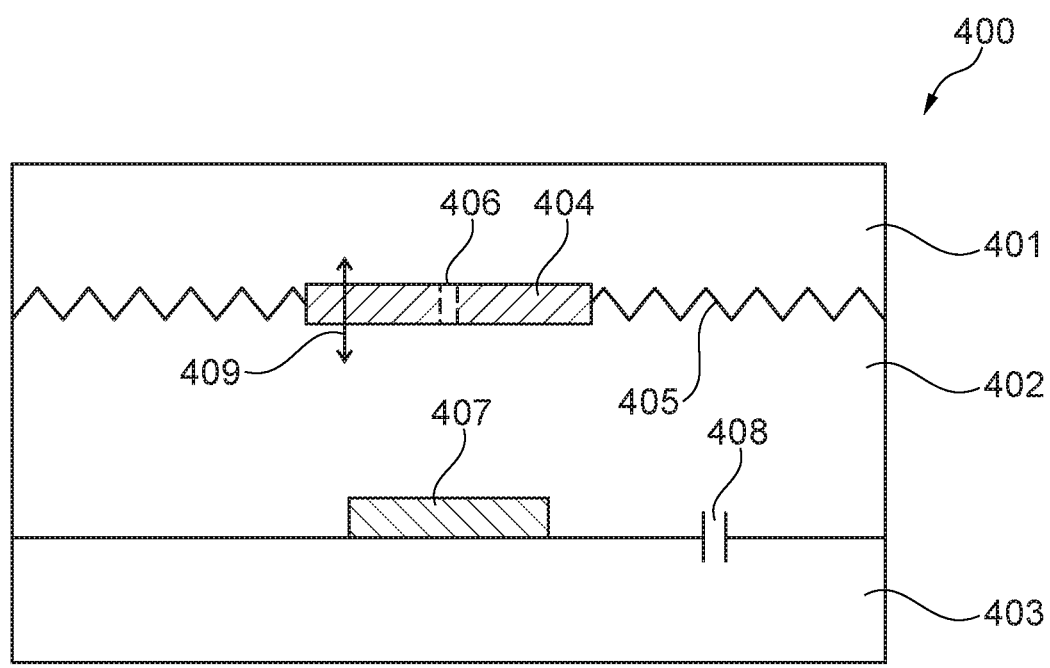
FIG. 4 shows a cross-sectional view of a vibration sensor having a low-frequency roll-off response and a damping of a resonance frequency.

Turning now to FIG. 4 an embodiment 400 comprising a first acoustical opening 408 and a second acoustical opening 406 is depicted. The first acoustical opening 408 provides a predetermined low-frequency roll-off response curve of the vibration sensor, whereas the second acoustical opening 406 provides a predetermined damping of the mechanical resonance frequency of the vibration sensor. In FIG. 4 the first acoustical opening 408 connects the pressure transmitting volume 402 to a substantially closed rear volume 403. Alternatively, the first acoustical opening 408 could connect the pressure transmitting volume 402 (front volume) with the exterior of the vibration sensor. The second acoustical opening 406 is provided through the moveable mass 404. Alternatively or in combination therewith, the second acoustical opening 406 could be provided through the resilient suspension member 405 to which the moveable mass 404 is secured. The moveable mass 404 is adapted to move as indicated by the arrow 409. The pressure variations induced by the moveable mass 404 is detected by the microphone 407.

Still referring to FIG. 4 a combined low-frequency roll-off and resonance peak damping may be provided by acoustically connecting volumes 401 and 403. Alternatively, the volumes 401 and 403 could be acoustically connected to the exterior of the vibration sensor whereby the low-frequencies will be boosted.

In the embodiments depicted in FIGS. 1-4 the moveable masses and the microphones are oppositely arranged relative to the pressure transmitting volumes. In alternative embodiments the pressure transmitting volume may be curved, bended or in other ways twisted so that the moveable mass and the microphone are no longer oppositely arranged, but rather angled relative to each other, cf. FIG. 8.

Figure 5:
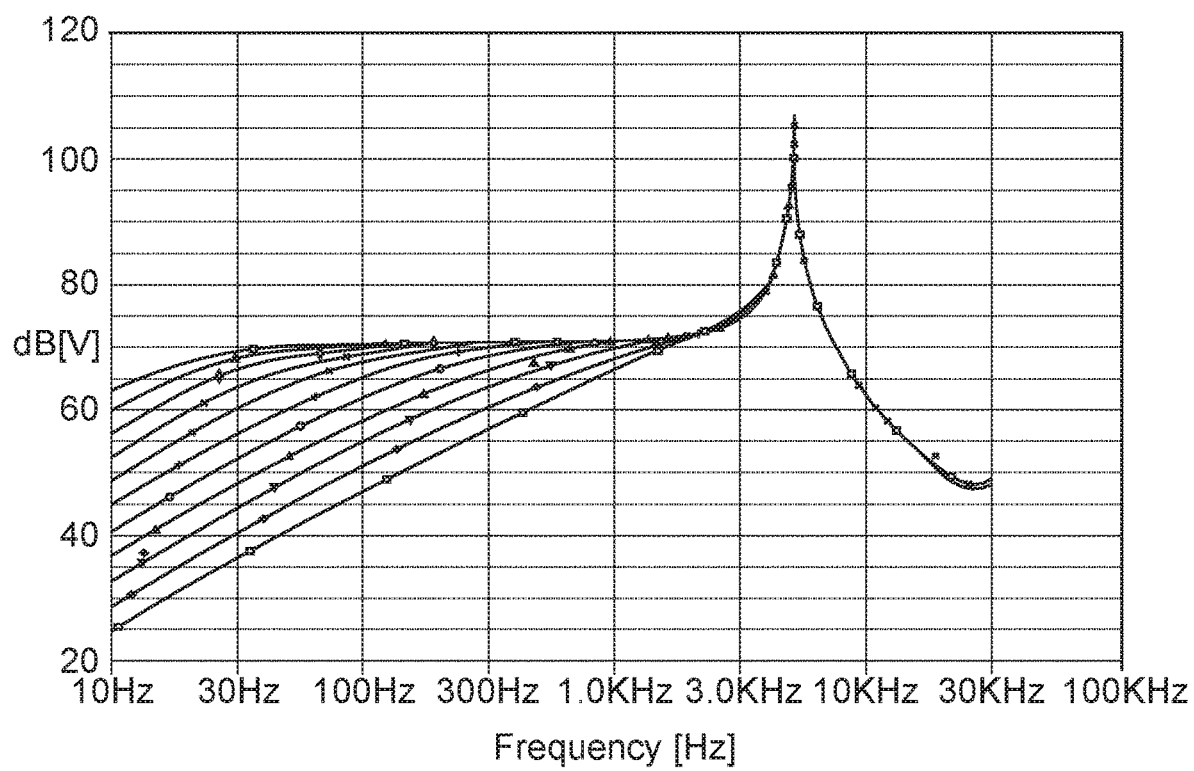
FIG. 5 shows various low-frequency roll-off responses.

In FIG. 5 various simulated low-frequency roll-off responses are depicted. The shape of the low-frequency roll-off is determined by the dimensions of the first acoustical opening 408, cf. FIG. 4. A large acoustical opening results in a small first acoustical impedance which causes a large low-frequency roll-off.

Figure 6:
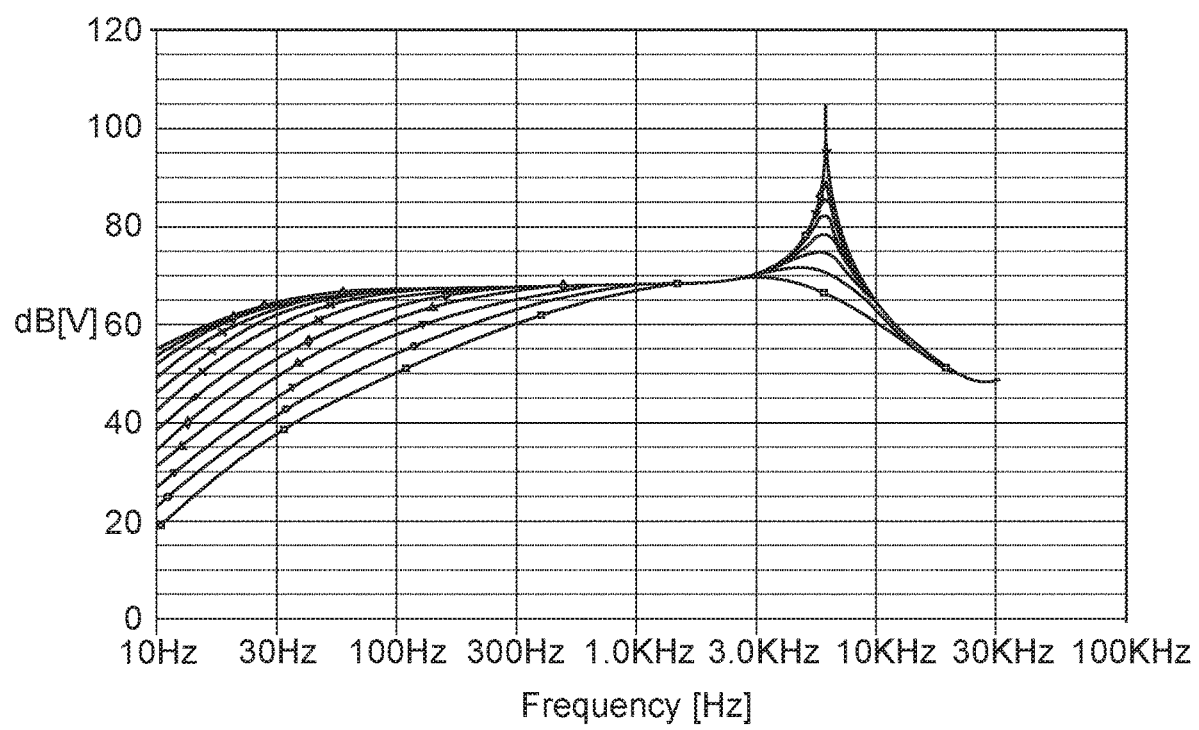
FIG. 6 shows various low-frequency roll-off responses and various damping characteristics of a resonance frequency.

Similar to FIG. 5 various simulated low-frequency roll-off responses are depicted in FIG. 6. In addition to the first acoustical opening 408, cf. FIG. 4, the damping effect of the second acoustical opening 406 is depicted as well. Again, a large acoustical opening results in a small second acoustical impedance which causes a low resonance frequency, i.e. high damping.

Figure 7:
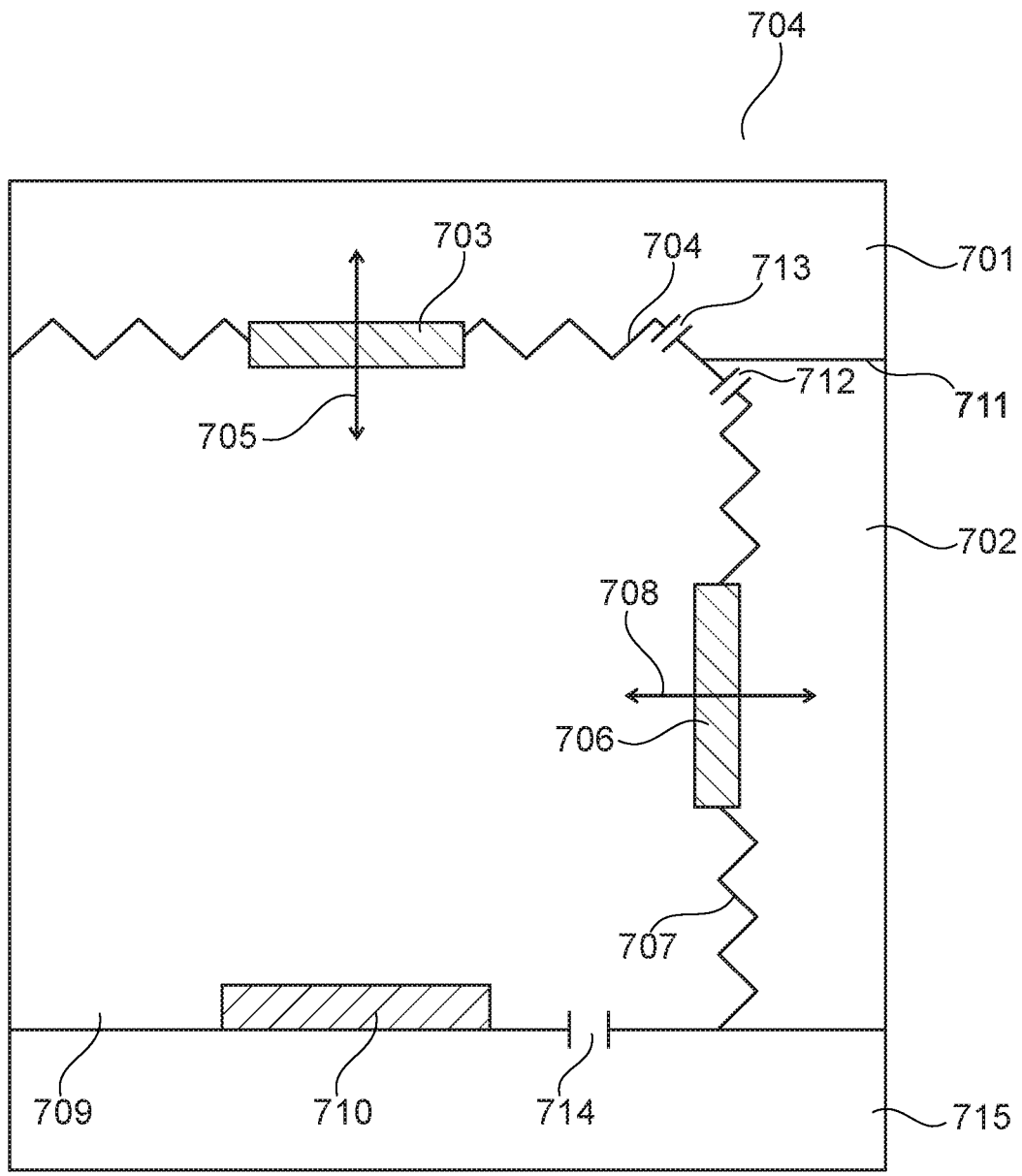
FIG. 7 shows a vibration sensor having two moveable masses and a common pressure transmitting arrangement.

FIG. 7 shows an embodiment 700 with two moveable masses 703, 706 being suspended in respective resilient suspension members 704, 707. As depicted in FIG. 7 the moveable masses 703, 706 are adapted to move in essentially perpendicular directions as indicated by the respective arrows 705, 708. Thus, the vibration sensor depicted in FIG. 7 is sensitive to vibrations in two perpendicular directions.

In order to provide a predetermined low-frequency roll-off response curve of the vibration sensor a first acoustical opening 714 is provided between the common pressure transmitting volume 709 and a substantially closed volume 715.

Second acoustical openings 712, 713 are provided between the common pressure transmitting volume 709 and the respective volumes 701, 702 which are acoustically separated by the wall 711. It should be noted that the wall 711 can optionally be omitted so that volumes 701 and 702 becomes a single volume, and second acoustical openings 712 and 713 act as a single acoustical opening. The second acoustical openings 712, 713 ensure a predetermined damping of the mechanical resonance frequency of the vibration sensor. A microphone 710 is provided in the common pressure transmitting volume 709.

Figure 8:
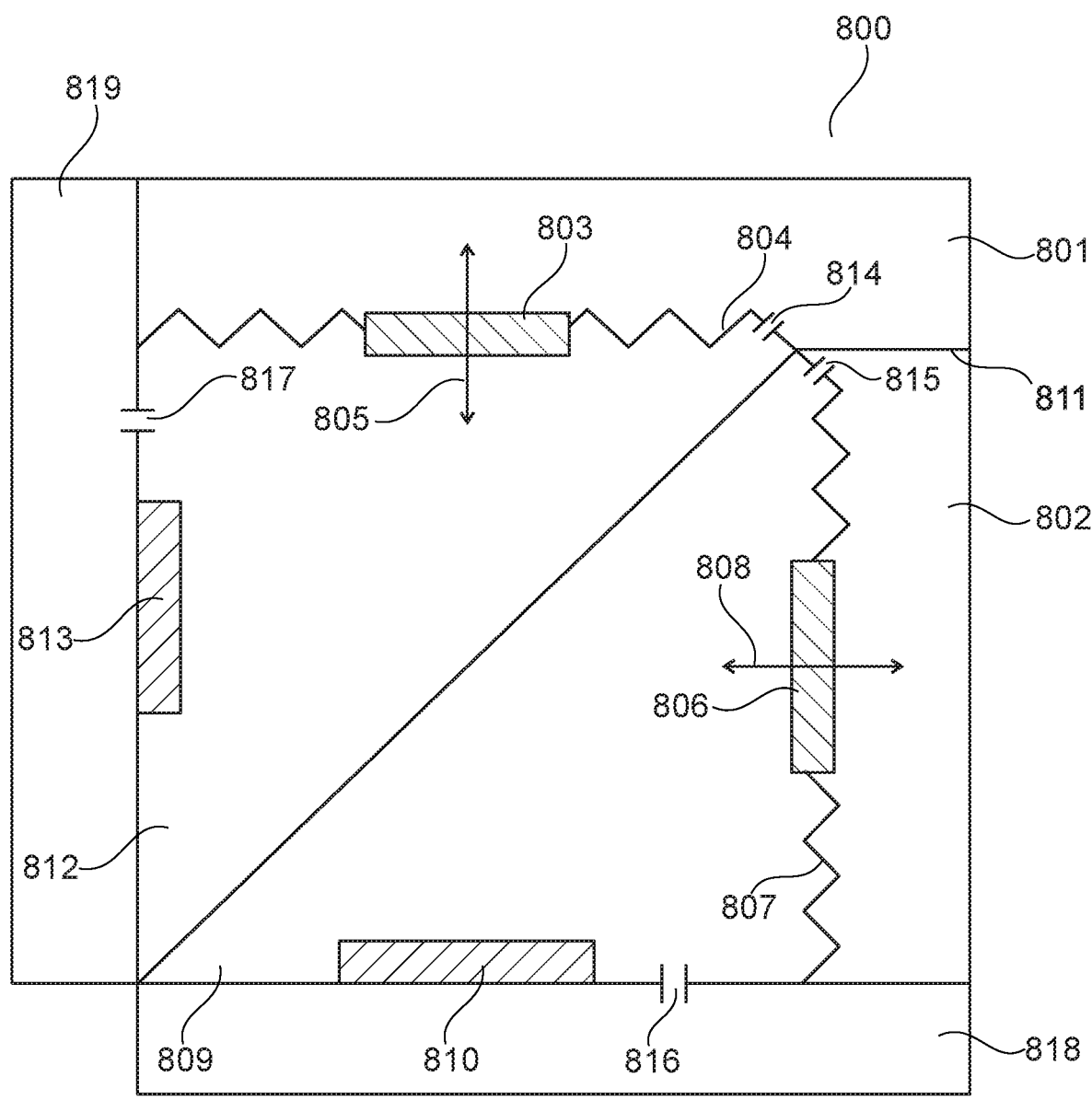
FIG. 8 shows a vibration sensor having two moveable masses and two pressure transmitting arrangements.

Turning now to FIG. 8 a vibration sensor 800 with separate pressure transmitting volumes 809, 812 and separate microphones 810, 813 is depicted. Similar to the embodiment of FIG. 7, the embodiment 800 shown in FIG. 8 comprises two moveable masses 803, 806 being suspended in respective resilient suspension members 804, 807. The moveable masses 803, 806 are adapted to move in essentially perpendicular directions as indicated by the respective arrows 805, 808.

Again, second acoustical openings 814, 815 are provided between the separated pressure transmitting volumes 812, 809 and the respective volumes 801, 802 which are acoustically separated by the wall 811. Similar to FIG. 7 the wall 811 can optionally be omitted so that volumes 801 and 802 becomes a single volume, and second acoustical openings 814 and 815 act as a single acoustical opening.

In order to provide a predetermined low-frequency roll-off response curve of the vibration sensor first acoustical openings 816, 817 are provided between the separated pressure transmitting volumes 809, 812 and respective substantially closed volumes 818, 819. Separate microphones 810, 813 are provided in the respective pressure transmitting volumes 809, 812. It should be noted that the pressure transmitting volumes 809, 812 may optionally be combined into a single pressure transmitting volume. Similarly, the substantially closed volumes 818, 819 may be combined as well.

The second acoustical openings 814, 815 ensure a predetermined damping of the mechanical resonance frequency of the vibration sensor.

Similar to the vibration sensor depicted in FIG. 7 the vibration sensor of FIG. 8 is sensitive to vibrations in two perpendicular directions. It should be noted however that vibration sensors having more than two moveable masses may be implemented as well. For example a 3D vibration sensor involving three moveable masses may be implemented if the movements of the respective three moveable masses are essentially perpendicular to each other.

Generally and as previously addressed, the moveable masses may be suspended to perform rotational movements instead of, or in combination with, linear movements.

Figure 9:
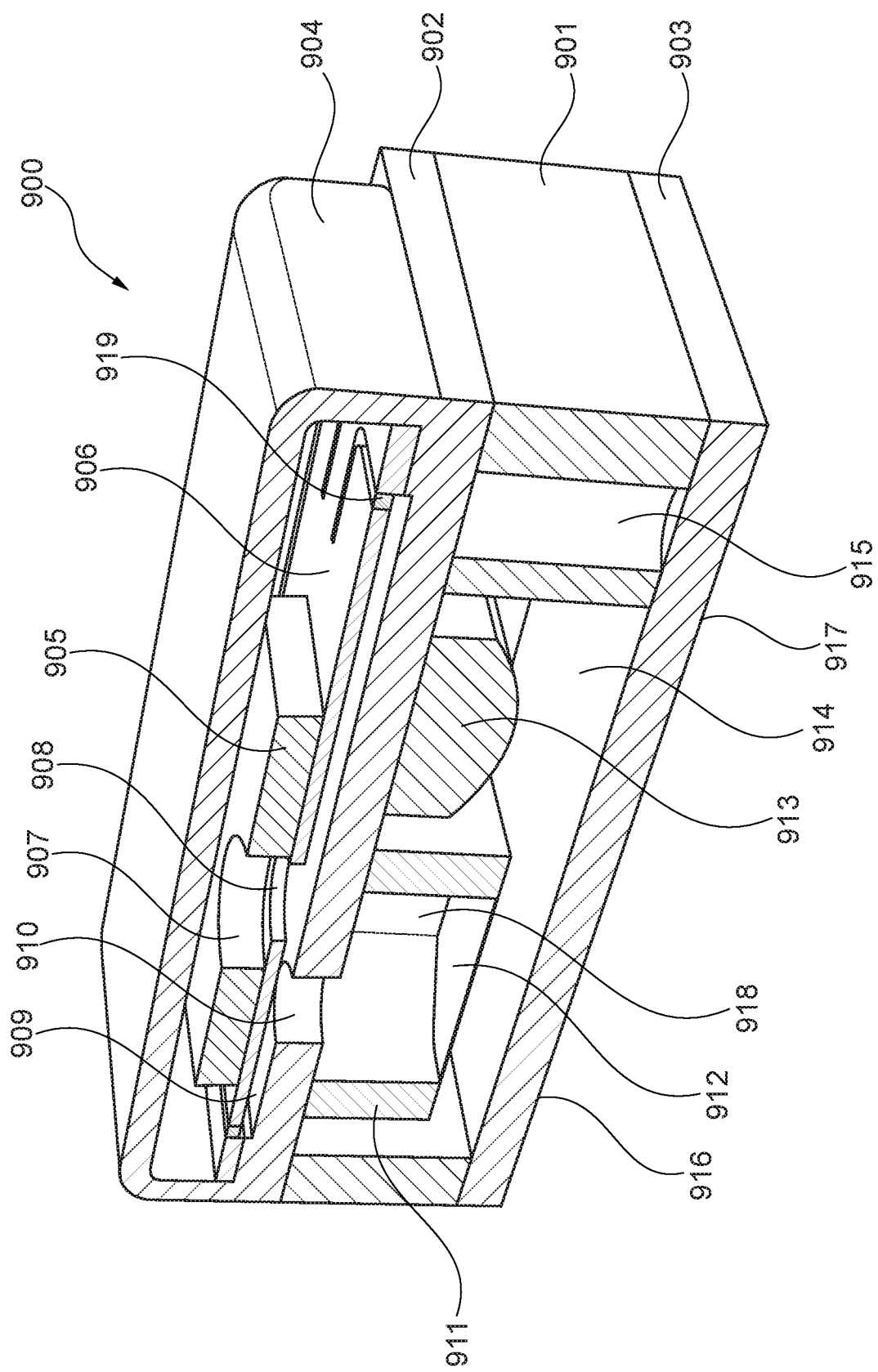
FIG. 9 shows a first combination of a MEMS microphone and a pressure variation generator.

FIG. 9 shows a vibration sensor 900 comprising a MEMS microphone and a pressure variation generator arranged on top of the MEMS microphone. The MEMS microphone may apply various technologies, including piezo, charged plate capacitor etc. The signal processing of the MEMS microphone may be analog or digital applying any digital coding scheme.

The MEMS microphone comprises a housing having a top PCB 902 and a bottom PCB 903 on which electrodes 916, 917 for electrically connecting the vibration sensor 900 are provided. The electrodes 916, 917 may be in the form of solder pads.

An acoustical opening 910 is provided in the top PCB 902. A wall portion 901 is provided between the top PCB 902 and the bottom PCB 903. Within the MEMS microphone a MEMS cartridge 911 comprising a membrane 912 and a front chamber 918 is provided. The MEMS microphone further comprises a back chamber 914 within which back chamber 914 a signal processor 913 and one or more via's 915 are provided. As addressed above a pressure variation generator is arranged on top of the MEMS microphone. As seen in FIG. 9 the pressure variation generator is secured to the top PCB 902. The pressure variation generator comprises a housing 904, a suspension member 906 and a moveable mass 905 secured to the suspension member 906. The suspension member 906 and the moveable mass 905 comprise respective acoustical openings 908 and 907.

The housing 904 of the pressure variation generator can be made of any suitable material as long as it seals the inside completely. Preferably, a thin metal shield is applied. A small hole with a low-frequency roll off below 10 Hz may be allowed as such a small hole does not introduce acoustic noise.

The mass of the moveable mass 905 is preferable around 4 mg. It is estimated that the practical minimum mass would be around 0.004 mg as this would add +30 dB to the noise. Similarly, a mass of 0.04 mg would add +20 dB to the noise, and a mass of 0.4 mg would add +10 dB to the noise. Thus, the higher the mass of the moveable mass the lower is the effect of the thermal movement noise of the vibration sensor.

The area of the suspension member 906 and the moveable mass 905 should be as large as possible, and preferably larger than 0.5 mm$^2$, such as larger than 1 mm$^2$, such as larger than 2 mm$^2$, such as larger than 4 mm$^2$, such as larger than 6 mm$^2$, such as larger than 8 mm$^2$, such as larger than 10 mm$^2$. A large area of the suspension member 906 and the moveable mass 905 is advantageous as this requires a smaller amplitude of the movement of the moveable mass 905 in order to reach certain volume displacement and thereby sensitivity.

As seen in FIG. 9 a small volume exists between the suspension member 906 and the upper side of the top PCB 902. The volume should be as small as possible, and preferably smaller than 5 mm$^3$, such as smaller than 2 mm$^3$, such as smaller than 1 mm$^3$, such as smaller than 0.75 mm$^3$, such as smaller than 0.5 mm$^3$, such as smaller than 0.25 mm$^3$, such as smaller than 0.1 mm$^3$.

A compliant sealing 919 in the form of for example a foil, membrane or gel is preferably provided along the edges of the suspension member 906. Preferably, the compliant sealing should have a low stiffness and it should be able to withstand reflow temperatures.

Optionally the volume above the suspension member 906 of the pressure variation generator may be acoustically connected to the back volume 914 of the MEMS microphone. This acoustical connection (not shown) may be provided by for example a tube.

Figure 10:
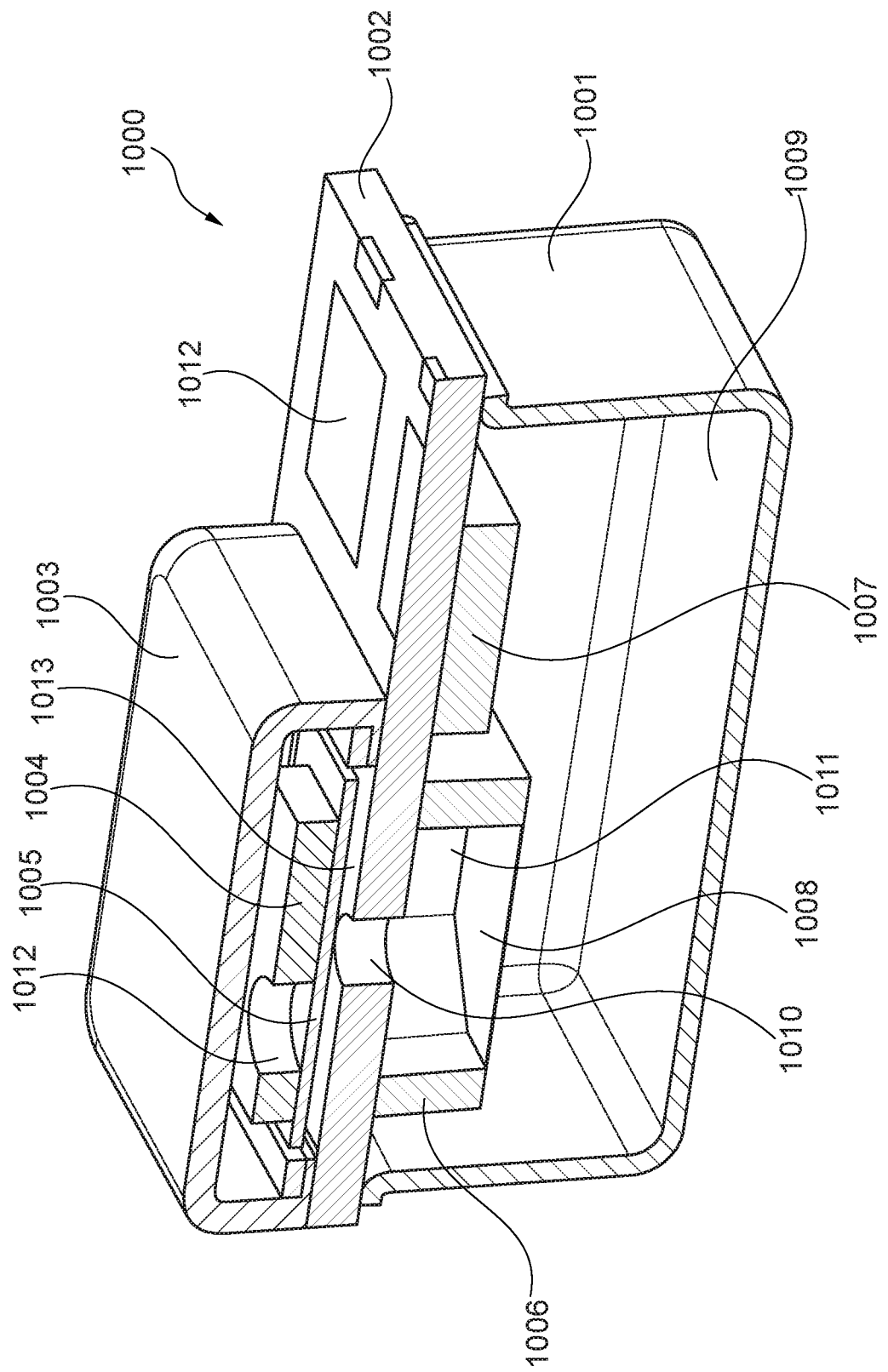
FIG. 10 shows a second combination of a MEMS microphone and a pressure variation generator.

FIG. 10 shows an alternative vibration sensor 1000 also comprising a MEMS microphone and a pressure variation generator arranged on top of at least part of the MEMS microphone. Again, the MEMS microphone may apply various technologies, including piezo, charged plate capacitor etc., and the signal processing of the MEMS microphone may be analog or digital applying any digital coding scheme.

Referring to FIG. 10 the MEMS microphone comprises a housing having a shield 1001 and PCB 1002 on which electrodes 1012 for electrically connecting the vibration sensor 1000 are provided. The electrode 1012 may be in form of solder pads.

An acoustical opening 1010 is provided in the PCB 1002. Within the MEMS microphone a MEMS cartridge 1006 comprising a membrane 1008 and a front chamber 1011 is provided. The MEMS microphone further comprises a back chamber 1009 within which back chamber 1009 a signal processor 1007 is provided. As addressed above a pressure variation generator is arranged on top of at least part of the MEMS microphone. As seen in FIG. 10 the pressure variation generator is secured to the PCB 1002. The pressure variation generator comprises a housing 1003, a suspension member 1005 and a moveable mass 1004 secured to the suspension member 1005. The moveable mass 1004, which has an opening 1012, and the suspension member 1005 may be implemented as disclosed in relation to the embodiment shown in FIG. 9.

Similar to the embodiment shown in FIG. 9 a small volume 1013 exists between the suspension member 1005 and the upper side of the PCB 1002. Again, this volume should be as small as possible, and preferably smaller than 5 mm$^3$, such as smaller than 2 mm$^3$, such as smaller than 1 mm$^3$, such as smaller than 0.75 mm$^3$, such as smaller than 0.5 mm$^3$, such as smaller than 0.25 mm$^3$, such as smaller than 0.1 mm$^3$.

Figure 11:
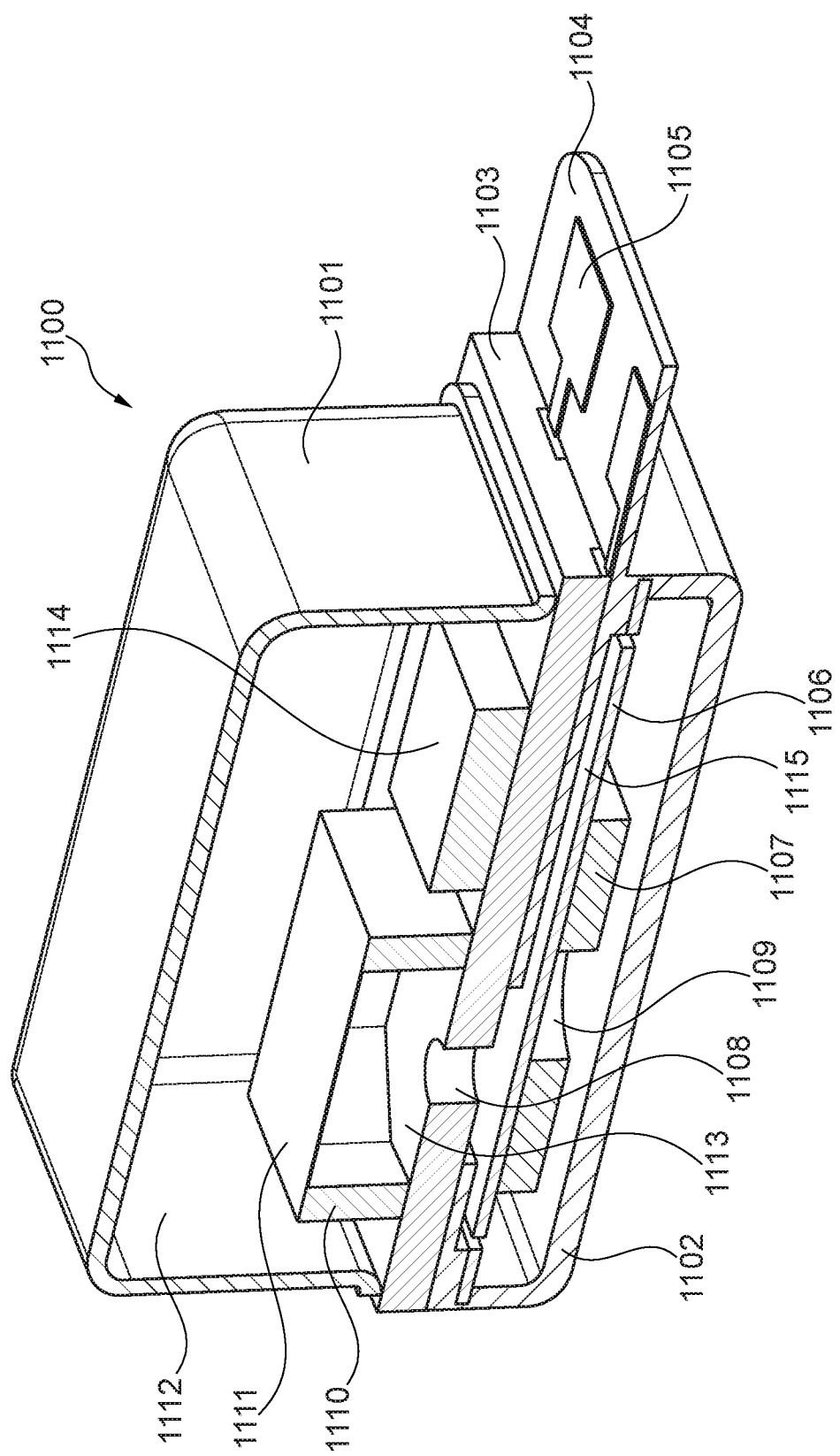
FIG. 11 shows a third combination of a MEMS microphone and a pressure variation generator.

FIG. 11 shows yet another vibration sensor 1100 also comprising a MEMS microphone and a pressure variation generator arranged on top of a MEMS microphone. Compared to FIGS. 9 and 10 the vibration sensor depicted in FIG. 11 is turned up-side down. Again, the MEMS microphone may apply various technologies, including piezo, charged plate capacitor etc., and the signal processing of the MEMS microphone may be analog or digital applying any digital coding scheme.

In FIG. 11 the MEMS microphone comprises a housing having a shield 1101, PCB 1103 and a support structure 1104 on which electrodes 1105 for electrically connecting the vibration sensor 1100 are provided. The electrodes 1105 may be in form of solder pads.

An acoustical opening 1108 is provided in the PCB 1103. Within the MEMS microphone a MEMS cartridge 1110 comprising a membrane 1111 and a front chamber 1113 is provided. The MEMS microphone further comprises a back chamber 1112 within which back chamber 1112 a signal processor 1114 is provided. As seen in FIG. 11 the pressure variation generator is secured to the PCB 1103. The pressure variation generator comprises a housing 1102, a suspension member 1106 and a moveable mass 1107 secured to the suspension member 1106. The moveable mass 1107, which comprises an opening 1109, and the suspension member 1106 may be implemented as disclosed in relation to the embodiment shown in FIG. 9.

Similar to the embodiments shown in FIGS. 9 and 10 a small volume 1115 exists between the suspension member 1106 and the lower side of the PCB 1103. Again, this volume should be as small as possible, and preferably smaller than 5 mm$^3$, such as smaller than 2 mm$^3$, such as smaller than 1 mm$^3$, such as smaller than 0.75 mm$^3$, such as smaller than 0.5 mm$^3$, such as smaller than 0.25 mm$^3$, such as smaller than 0.1 mm$^3$.

The invention claimed is:

1. A vibration sensor comprising:
   a pressure detecting arrangement adapted to detect generated pressure variations, and provide an output signal in response to the detected pressure variations, and
   a pressure generating arrangement adapted to generate pressure variations in response to movements thereof, the pressure generating arrangement comprising a suspension member,
   wherein an intermediate volume exists between the pressure detecting arrangement and the suspension member of the pressure generating arrangement, and wherein a front volume of the pressure detecting arrangement is acoustically connected to the intermediate volume.

2. The vibration sensor according to claim 1, wherein the pressure generating arrangement further comprises a moveable mass secured to the suspension member.

3. The vibration sensor according to claim 1, wherein the intermediate volume exists between an outer surface of the pressure detecting arrangement and a surface of the suspension member, and wherein the outer surface of the pressure detecting arrangement includes a through-going opening acoustically connected to the intermediate volume.

4. The vibration sensor according to claim 1, wherein the pressure detecting arrangement comprises a microphone unit.

5. The vibration sensor according to claim 4, wherein the microphone unit comprises a microphone cartridge and a signal processing unit.

6. The vibration sensor according to claim 4, wherein the microphone unit comprises a stand-alone and self-contained MEMS microphone unit.

7. The vibration sensor according to claim 6, wherein the MEMS microphone unit comprises a MEMS microphone cartridge and the signal processing unit.

8. The vibration sensor according to claim 7, wherein the stand-alone and self-contained MEMS microphone unit comprises a first PCB to which the MEMS microphone cartridge and the signal processing unit are electrically connected.

9. The vibration sensor according to claim 8, wherein the stand-alone and self-contained MEMS microphone unit comprises a second PCB comprising a plurality of contact zones arranged thereon.

10. The vibration sensor according to claim 9, wherein the second PCB is oppositely arranged relative to the first PCB.

11. The vibration sensor according to claim 8, wherein the intermediate volume exists between an outer surface of the first PCB of the MEMS microphone unit and a surface of the suspension member, and wherein the first PCB comprises a through-going opening being acoustically connected to the intermediate volume.

12. The vibration sensor according to claim 11, wherein the intermediate volume is smaller than 5 mm$^3$.

13. The vibration sensor according to claim 11, wherein the intermediate volume is smaller than 1 mm$^3$.

14. The vibration sensor according to claim 11, wherein the intermediate volume is smaller than 0.5 mm$^3$.

15. The vibration sensor according to claim 11, wherein the intermediate volume is smaller than 0.1 mm$^3$.

16. The vibration sensor according to claim 1, wherein the area of the suspension member is larger than 0.5 mm$^2$.

17. The vibration sensor according to claim 1, wherein the area of the suspension member is larger than 2 mm$^2$.

18. The vibration sensor according to claim 1, wherein the area of the suspension member is larger than 4 mm$^2$.

19. The vibration sensor according to claim 1, wherein the area of the suspension member is larger than 8 mm$^2$.

20. The vibration sensor according to claim 1, wherein the area of the suspension member is larger than 10 mm$^2$.

21. The vibration sensor according to claim 2, wherein the mass of the moveable mass is larger than 0.004 mg.

22. The vibration sensor according to claim 2, wherein the mass of the moveable mass is larger than 0.04 mg.

23. The vibration sensor according to claim 2, wherein the mass of the moveable mass is larger than 0.4 mg.

24. The vibration sensor according to claim 2, wherein the mass of the moveable mass is 4 mg.

25. A vibration sensor comprising:
   a pressure detecting arrangement adapted to detect generated pressure variations, and provide an output signal in response to the detected pressure variations, and
   a pressure generating arrangement adapted to generate pressure variations in response to movements thereof, the pressure generating arrangement comprising a suspension member,
   wherein an intermediate volume exists between the pressure detecting arrangement and the suspension member of the pressure generating arrangement, and
   wherein the intermediate volume exists between an outer surface of the pressure detecting arrangement and a surface of the suspension member, and wherein the outer surface of the pressure detecting arrangement includes a through-going opening acoustically connected to the intermediate volume.

* * * * *